United States Patent
Luo et al.

(10) Patent No.: US 12,436,765 B2
(45) Date of Patent: Oct. 7, 2025

(54) DATA PROCESSING APPARATUS, CHIP, AND DATA PROCESSING METHOD

(71) Applicant: Stream Computing Inc., Beijing (CN)

(72) Inventors: Fei Luo, Beijing (CN); Weiwei Wang, Beijing (CN)

(73) Assignee: Stream Computing, Inc., Beijing (CN)

( * ) Notice: Subject to any disclaimer, the term of this patent is extended or adjusted under 35 U.S.C. 154(b) by 86 days.

(21) Appl. No.: 18/049,483

(22) Filed: Oct. 25, 2022

(65) Prior Publication Data

US 2023/0069032 A1  Mar. 2, 2023

Related U.S. Application Data

(63) Continuation of application No. PCT/CN2021/086850, filed on Apr. 13, 2021.

(51) Int. Cl.
*G06F 9/30* (2018.01)
*G06F 9/38* (2018.01)
*G06F 15/80* (2006.01)

(52) U.S. Cl.
CPC ........ *G06F 9/30181* (2013.01); *G06F 9/3877* (2013.01); *G06F 9/3885* (2013.01); *G06F 15/8007* (2013.01); *G06F 15/8046* (2013.01)

(58) Field of Classification Search
CPC .. G06F 9/30181; G06F 9/3877; G06F 9/3885; G06F 15/8007; G06F 15/8046; G06F 9/4887; Y02D 10/00
See application file for complete search history.

(56) References Cited

U.S. PATENT DOCUMENTS

| 4,200,915 A | * | 4/1980 | Struger ............... G05B 19/056 700/87 |
| 2008/0229093 A1 | * | 9/2008 | Butts .................... G06F 15/16 713/100 |
| 2008/0235493 A1 | | 9/2008 | Fortier |
| 2016/0063665 A1 | | 3/2016 | Johnson |

(Continued)

FOREIGN PATENT DOCUMENTS

| CN | 101901207 A | 12/2010 |
| CN | 103092788 A | 5/2013 |

(Continued)

OTHER PUBLICATIONS

Iwamoto et al.; Evaluation of a Chained Systolic Array with High-Speed Links; IEEE; 2019 (Year: 2019).*

(Continued)

*Primary Examiner* — Corey S Faherty
(74) *Attorney, Agent, or Firm* — Andrus Intellectual Property Law, LLP (57) ABSTRACT

Disclosed is a data processing apparatus, chip, and data processing method. The data processing apparatus includes: a plurality of processing cores having a preset execution sequence, the plurality of processing cores including a head processing core and at least one other processing core; wherein the head processing core is configured to send an instruction, and receive and execute a program obtained according to the instruction; and each of the other processing cores is configured to receive and execute a program sent by a previous processing core in the preset execution sequence.

18 Claims, 4 Drawing Sheets

(56) References Cited

U.S. PATENT DOCUMENTS

2016/0127173 A1\* 5/2016 Gagnon ............ H04L 12/40123
      709/211
2019/0017384 A1  1/2019 Mahle et al.
2019/0050717 A1\* 2/2019 Temam ................. G06F 9/3895

FOREIGN PATENT DOCUMENTS

| CN | 103377085 A | 10/2013 |
| CN | 104011705 A | 8/2014 |
| CN | 106547721 A | 3/2017 |
| CN | 110222007 A | 9/2019 |
| JP | 2019204387 A | 11/2019 |

OTHER PUBLICATIONS

Iwamoto et al.; Daisy-Chained Systolic Array and Reconfigurable Memory Space for Narrow Memory Bandwidth; IEICE; Mar. 2020 (Year: 2020).\*

Rixner et al.; A Bandwidth-Efficient Architecture for Media Processing; IEEE; 1998 (Year: 1998).\*

Extended European Search Report for European Patent Application No. EP21795267.0, dated Jul. 14, 2023.

Office Action for Chinese Patent Application No. 202010355914.5, dated Jul. 1, 2023.

International Search Report for PCT Application No. PCT/CN2021/086850, mailed Jun. 30, 2021.

\* cited by examiner

DATA PROCESSING APPARATUS, CHIP, AND DATA PROCESSING METHOD

CROSS-REFERENCE TO RELATED APPLICATIONS

This application is a continuation application of International Patent Application No. PCT/CN2021/086850 filed on Apr. 13, 2021, which in turn claims priority to Chinese Patent Application No. 202010355914.5 filed on Apr. 29, 2020, the entire contents of which are incorporated herein by reference for all purposes.

TECHNICAL FIELD

The disclosure relates to the technical field of processing cores, in particular, relates to a data processing apparatus, chip, and data processing method.

BACKGROUND

With the development of science and technology, human society is rapidly entering an era of intelligence. The important feature of the era of intelligence is that people may acquire more and more types of data, the amount of data that people may acquire is becoming larger and larger, and the demand for the data processing speed is becoming higher and higher.

Chips are the cornerstone of data processing, which essentially determine the ability to process data. From the perspective of application fields, the chips are mainly developed in two routes. One is general-purpose chips, for example, central processing units (CPU) and the like, which can provide great flexibility but have low effective computing power when processing algorithms in a specific field; the other is special-purpose chips, for example, tensor processing units (TPU) and the like, which have high effective computing power in certain specific fields but are poor in processing capacity or even have no processing capacity in flexible and universal fields.

Due to various data types and numerous data volumes in the era of intelligence, the chips are required to not only process changing algorithms in different fields with extremely high flexibility, but also rapidly process a great number of dramatically increasing data volumes with extremely strong processing capacities.

In neural network computing, multi-core or many-core chips are often used. Processing cores in a multi-core or many-core chip all have a certain ability to process data independently, and also have a relatively large internal storage space, for storing their own programs, data and weights. How to efficiently exploit the computing power of the many cores is the key to determining the performance of the entire chip. The utilization of computing power of each core depends on a variety of factors, such as task scheduling and allocation, chip architecture, core structure, and core circuitry. Among them, task scheduling and allocation is a very critical factor. If the scheduling and allocation of tasks are reasonable, the effective computing power of each core can be fully utilized; otherwise, the effective computing power of each core is low.

SUMMARY

The present disclosure provides a data processing apparatus, chip, and data processing method.

A first aspect of the present disclosure provides a data processing apparatus, including: a plurality of processing cores having a preset execution sequence, the plurality of processing cores including a head processing core and at least one other processing core; wherein the head processing core is configured to send an instruction, and receive and execute a program obtained according to the instruction; and each of the other processing cores is configured to receive and execute a program sent by a previous processing core in the preset execution sequence.

In the data processing apparatus provided in an embodiment, the head processing core sends the instruction and receives the program obtained according to the instruction, and each of the other processing core receives and executes the program sent by the previous processing core in the preset execution sequence. There is no need to configure each processing core to read data from Memory separately, thereby reducing power consumption.

Optionally, each of the other processing cores is configured to receive and execute the executed program sent by the previous processing core.

Further optionally, each of the other processing cores is configured to receive and execute the just completed program sent by the previous processing core.

Optionally, the other processing cores include an intermediate processing core and a tail processing core; and the intermediate processing core is configured to send the executed program to the subsequent processing core.

Optionally, the data processing apparatus further includes: a memory management engine, configured to receive the instruction sent by the head processing core, obtain the program from an external storage according to the instruction, and send the obtained program to the head processing core.

Optionally, the data processing apparatus further includes a synchronization generator, configured to generate a synchronization signal after receiving a synchronization request signal sent by each of the plurality of processing cores, and send the synchronization signal to each of the processing cores.

Optionally, the head processing core is configured to send the instruction according to the synchronization signal; and each of the other processing cores is configured to receive and execute the program sent by the previous processing core according to the synchronization signal.

Optionally, the other processing cores include an intermediate processing core and a tail processing core; each of the intermediate processing cores is configured to send, according to the synchronization signal, a program that was executed in a cycle of a previous synchronization signal to a subsequent processing core.

Optionally, the intermediate processing core is configured to, at the time of receiving the program sent by the previous processing core, send the program that was executed in the cycle of the previous synchronization signal to the subsequent processing core.

Optionally, the head processing core is further configured to store a first update program; and the head processing core is configured to send the instruction, including:

the head processing core is configured to execute the first update program when receiving the synchronization signal, and send the instruction according to the first update program.

Further optionally, each of the intermediate processing cores is further configured to store a second update program; each intermediate processing core is configured to execute the second update program when receiving the synchronization signal, and send the program that was executed in the cycle of the previous synchronization signal to the subsequent processing core according to the second update program.

Optionally, each processing core in the plurality of processing cores is further configured to, after executing the corresponding program received, send the synchronization request signal, respectively.

Optionally, the program obtained according to the instruction is a program segment.

According to a second aspect of the present disclosure, there is provided a chip, including one or more data processing apparatuses provided in the first aspect.

According to a third aspect of the present disclosure, there is provided a circuit board, including one or more chips provided in the second aspect.

According to a fourth aspect of the present disclosure, there is provided an electronic device, including one or more circuit boards provided in the third aspect.

According to a fifth aspect of the present disclosure, there is provided a data processing method, applicable in a data processing apparatus, the data processing apparatus including a plurality of processing cores with a preset execution sequence, the plurality of processing cores including a head processing core and at least one other processing core, the data processing method including: sending an instruction, and receiving and executing a program obtained according to an instruction, by the head processing core; receiving and executing a program sent by a previous processing core in the preset execution sequence, by each of the other processing cores.

According to a sixth aspect of the present disclosure, there is provided a computer storage medium storing a computer program, which, upon execution by a processor, implements the data processing method of the fifth aspect.

According to a seventh aspect of the present disclosure, there is provided an electronic device, including a memory, a processor, and a computer program stored in the memory and executable by the processor, wherein the processor executing the program implements the data processing method of the fifth aspect.

According to an eighth aspect of the present disclosure, there is provided a computer program product, including computer instructions, wherein, when the computer instructions are executed by a computing device, the computing device executes the data processing method of the fifth aspect.

In the data processing apparatus provided in an embodiment, the head processing core sends the instruction and receives the program obtained according to the instruction, and each of the other processing core receives and executes the program sent by the previous processing core in the preset execution sequence. There is no need to configure each processing core to read data from the Memory separately, thereby reducing power consumption. Further, the multiple processing cores can execute the same program without designing complex parallel circuits. In addition, each processing core executes a complete program from beginning to end, which avoids data exchange between cores, reduces the delay and power consumption caused by exchanging data, and improves the efficiency of data processing.

DETAILED DESCRIPTION

In order to make the objective, technical solutions and advantages of the present disclosure clearer, the present disclosure is further described in detail below in conjunction with specific embodiments and with reference to the accompanying drawings. It should be understood that these descriptions are exemplary only and are not intended to limit the scope of the present disclosure. In addition, in the following description, descriptions of well-known structures and techniques are omitted to avoid unnecessary confusion about the concepts of the present disclosure.

Clearly, the described embodiments are some, but not all, embodiments of the present disclosure. Based on the embodiments of the present disclosure, all other embodiments obtainable by those of ordinary skill in the art without creative efforts shall fall within the scope of protection of the present disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. As used herein, the term "if" may be understood to mean "when" or "upon" or "in response to" depending on the context.

In the description of the present disclosure, it should be noted that the terms "first", "second", and "third" are only used for descriptive purposes and cannot be construed as indicating or implying relative importance.

The term "include" and its variations are used herein as an open inclusion, that is, "including, but not limited to". The term "based on" means "based, at least in part, on". The term "an embodiment" means "at least one embodiment". The term "another embodiment" means "at least one additional embodiment". The term "some embodiments" means "at least some embodiments".

In addition, the technical features involved in the different embodiments of the present disclosure described below can be combined with each other as long as they do not conflict with each other.

Further, existing components that do not involve the improvement of the present disclosure may be briefly described or not described, and components that have been improved relative to the prior art will be described in detail.

Figure 1:
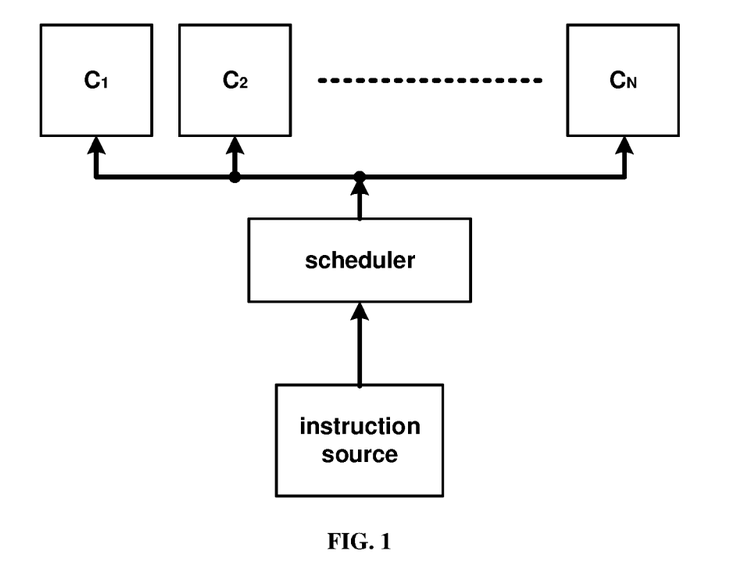
FIG. 1 is a schematic structural diagram of a chip provided by the prior art.

FIG. 1 is a schematic structural diagram of a chip provided by the prior art.

As shown in FIG. 1, the chip includes a scheduler and a plurality of processing cores $C_1$ to $C_N$. In the chip shown in FIG. 1, the scheduler receives an instruction sent from outside the chip, for example, the scheduler receives an instruction from an instruction source outside the chip, and then transmits the instruction to each processing core at the same time, and each processing core executes the same instruction but processes different data. For example, the instruction is to compute the sum of parameter a and parameter b, but the parameter a for different processing cores may represent different values, so although two processing cores both execute a+b, due to the different values of the parameter, the obtained results are different. That is, each processing core executes the same instruction and processes different data.

For the chip architecture shown in FIG. 1, each processing core may have a relatively simple structure, such as Single Instruction Multiple Data (SIMD) structure, or Single Instruction Multiple Threads (SIMT) structure.

Generally, this method has the following disadvantages:

If multiple processing cores need to execute the same program, the instructions can only be passively received from the outside through the scheduler, and then sent to each processing core in parallel by the scheduler. Therefore, complex parallel circuits need to be designed in the chip, resulting in a large area.

Figure 2:
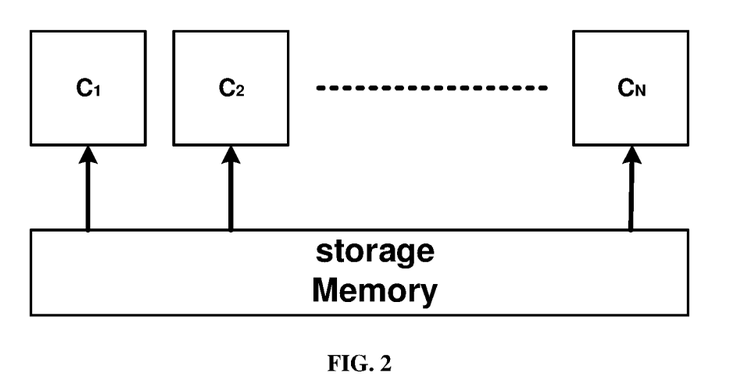
FIG. 2 is a schematic structural diagram of a chip provided by another prior art.

FIG. 2 is a schematic structural diagram of a chip provided by another prior art.

As shown in FIG. 2, the chip includes a plurality of processing cores $C_1$ to $C_N$ and a storage (Memory). In the chip shown in FIG. 2, each core can independently read instructions from the Memory (such as DDR, SDRAM) and perform computations. Usually, each core has a complete control circuit, register group and other circuits. This structure is common in multi-core CPUs or ASICs.

Generally, this method has the following disadvantages:

Multiple processing cores may frequently access the instruction storage area, resulting in a decrease in storage access efficiency, which in turn affects the performance of the chip's computing power.

Figure 3:
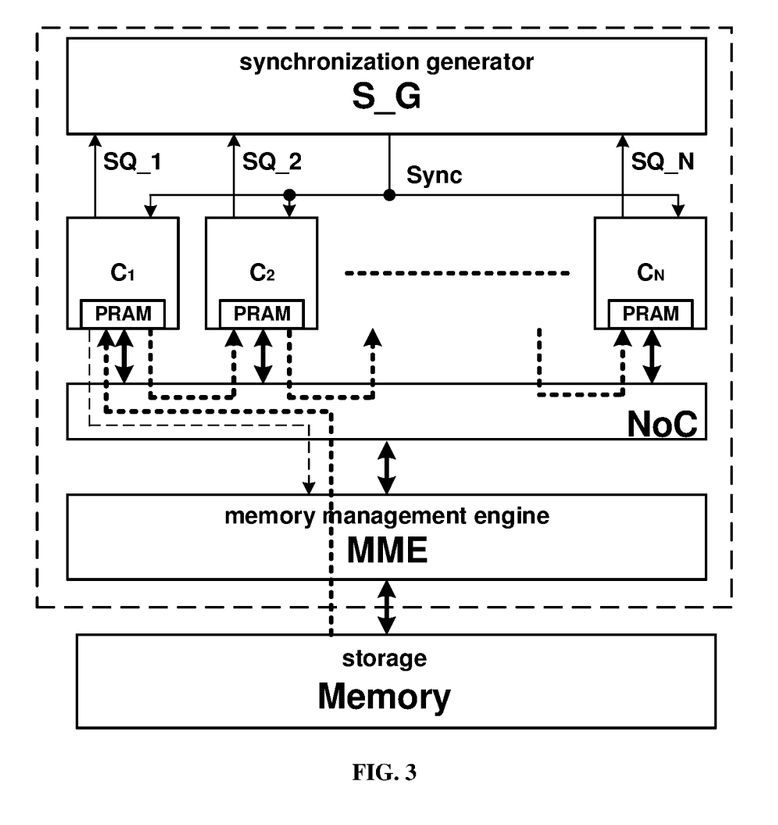
FIG. 3 is a schematic structural diagram of a data processing apparatus according to an embodiment of the present disclosure.

FIG. 3 is a schematic structural diagram of a data processing apparatus according to an embodiment of the present disclosure.

As shown in FIG. 3, the data processing apparatus includes: a plurality of processing cores having a preset execution sequence, and the plurality of processing cores may refer to, for example, processing core $C_1$ to processing core $C_N$.

It should be noted that, in the present disclosure, during the operation of the chip, all processing cores logically form a logical core chain, that is, $C_1$ to $C_N$ are sequentially numbered according to the logic of sending programs. That is, the preset execution sequence refers to the order of the processing cores in the logical core chain. For the sake of description, the present disclosure refers to the first core in the logical core chain as the head processing core, and refers to the processing cores other than the head processing core as other processing cores. The last processing core in the logical core chain among the other processing cores is named the tail processing core, and the processing cores other than the tail processing core in the logical core chain among the other processing cores are named the intermediate processing cores. There is no master-slave relationship among all the processing cores in the logical core chain, but only a logical sequential relationship.

Each of the plurality of processing cores is provided with a storage PRAM, which is used to store the programs received by the respective processing cores. The PRAM may be, for example, a Static Random Access Memory (SRAM) of a certain size (usually >=16 KB) dedicated to storing programs.

The plurality of processing cores include a head processing core and at least one other processing core. The head processing core is, for example, processing core $C_1$, and the other processing cores are, for example, processing core $C_2$ to processing core $C_N$.

Among them, the head processing core is configured to send an instruction, and receive and execute a program obtained according to the instruction.

Each of the other processing cores is configured to receive and execute a program sent by a previous processing core in the preset execution sequence.

The previous processing core refers to the processing core preceding and adjacent to the present processing core according to the preset execution sequence. For example, for processing core $C_3$, its previous processing core is $C_2$.

It can be understood that, in the embodiment, a processing core receiving a program refers to storing the program in the respective PRAM, and the program executed by the processing core is also the program stored in the PRAM of the core. Therefore, in the data processing apparatus provided by the embodiment of the present disclosure, it is not necessary for the processing cores to read instructions from the external Memory, so that each processing core does not occupy the Memory, and the power consumption is reduced. Moreover, since the processing cores all read programs from their own PRAMs, the design of complex Cache circuits may be avoided; and the processing cores execute programs stored in their respective PRAMs with fast program execution and low latency, which may greatly improve the execution efficiency of the instruction.

Optionally, in the data processing apparatus, each processing core has the same circuit structure.

It should be noted that, in some prior art, a data processing apparatus needs the cooperation of multiple processing cores to complete a relatively large computing task. For example, one processing core executes the first part of the computing task, and then sends the computation result to another processing core. The another processing core takes the computation result as the input, executes the second part of the computing task, and obtains the final computation result. However, in the data processing apparatus provided by the embodiment of the present disclosure, each processing core can execute the same program without designing complex parallel circuits, which saves the area of the data processing apparatus; and each processing core can execute the same complete program from beginning to end without the need to send the computation result to another processing core, so that the another processing core does not need to wait for the computation result, thereby reducing the delay and power consumption caused by data exchange, and improving the efficiency of data processing. The data processing apparatus provided by the present disclosure at least partially alleviates the technical problem of high power consumption caused by multiple processing cores that need to access the instruction storage area separately to execute the same program.

In an embodiment, each of the other processing cores is configured to receive and execute the executed program sent by the previous processing core.

Further, each of the other processing cores is configured to receive and execute the latest executed program sent by the previous processing core. The latest executed program refers to the program that has been executed just before the current time, i.e., the executed program that is closest to the current time.

In this embodiment, the subsequent processing cores in the preset execution sequence execute the programs that have been just completed by the respective adjacent previous processing cores, so that in the data processing apparatus, multiple processing cores execute the same program. This enables multiple processing cores to execute programs in parallel, which can complete the task in large batches and improve the computing power of the entire chip. The data processing apparatus is more suitable for data processing and task execution in neural networks with batch execution.

Optionally, the other processing cores include at least one intermediate processing core (e.g., processing core $C_2$ to processing core $C_{N-1}$) and a tail processing core $C_N$.

Among them, each of the intermediate processing cores is configured to send the executed program to a subsequent processing core.

Further, each of the intermediate processing cores is configured to send the program that has been just executed to the subsequent processing core.

In this embodiment, since the $C_N$ is at the last position in the preset execution sequence, it does not need to send the program that has been just executed.

In an embodiment, the intermediate processing core is configured to, at the time of receiving the program that is sent by the previous processing core, send the program that has been just executed to the subsequent processing core.

The head processing core sends the program that has been just executed to the subsequent processing core ($C_2$ in this example) at the time of receiving the program according to the instruction.

In this embodiment, all processing cores except the tail processing core receive and send programs simultaneously, so that all processing cores are able to implement program update in parallel, greatly reducing the delay caused by program update.

In an embodiment, each intermediate processing core sends the program that has been just executed to the subsequent processing core, and after receiving the program sent by the previous processing core, starts to execute the respective received program.

The head processing core is configured to, after sending the program that has been just executed to the subsequent processing core and receiving the new program obtained according to the instruction, start to execute the new program.

The tail processing core is configured to, after receiving the just-executed program sent by the previous processing core, start to execute the program.

It can be understood that, in some embodiments of the present disclosure, among the multiple processing cores with the preset execution sequence, except the tail processing core, each processing core sends a program to the respective subsequent processing core according to the preset execution sequence. That is, a program is sequentially transferred from the head processing core to the tail processing core according to the preset execution sequence.

In an embodiment, the data processing apparatus further includes a memory management engine (MME), configured to receive the instruction sent by the head processing core, obtain the program from an external storage (Memory) according to the instruction, and send the obtained program to the head processing core. The MME may also store instructions, parse instructions and execute instructions, and may also complete the data transmission between the RAM inside the chip and the Memory. The MME may be, for example, a Direct Memory Access Controller (DMAC).

In this embodiment, the MME only needs to read the program from the external Memory according to the instruction sent by the head processing core, and only send the program to the head processing core, without sending the program to other processing cores separately. Therefore, it does not need to design a complex circuit structure in the MME, and all the processing cores can execute the same program without the MME sending the program to all the processing cores separately, thereby reducing delay and power consumption.

In an embodiment, the data processing apparatus further includes a Synchronization Generator (S_G).

The S_G is configured to generate a synchronization signal after receiving a synchronization request signal sent by each of the plurality of processing cores, and send the synchronization signal to each of the processing cores.

In this embodiment, in the data processing apparatus, S_G is provided, and the S_G may synchronize the updating and execution of the programs among the processing cores, thereby reducing the complexity of synchronization among the processing cores.

In an embodiment, the head processing core is configured to send the instruction according to the synchronization signal. Each of the other processing cores is configured to receive and execute the program sent by a previous processing core according to the synchronization signal.

Each of the intermediate processing cores is configured to send, according to the synchronization signal, a program that was executed in a cycle of a previous synchronization signal to a subsequent processing core. The cycle of the previous synchronization signal refers to the time period between the receipt of the previous synchronization signal and the receipt of the current synchronization signal.

Specifically, when the synchronization signal comes, it marks the beginning of a certain synchronization cycle, and the head processing core in the logical core chain sends a program update instruction to the MME when the synchronization signal comes. The thin dashed line with arrows from $C_1$ to the MME in FIG. 3 represents the transfer process of the instruction. The MME receives the instruction, parses the instruction, and then executes the instruction, i.e., to fetch a new program from the external Memory and send it to the PRAM of the head processing core. The dotted lines with arrows between adjacent processing cores represent the transfer process of the program.

Optionally, each intermediate processing core is configured to first determine whether the program was executed in the cycle of the previous synchronization signal according to the synchronization signal. If the program was executed in the cycle of the previous synchronization signal, the intermediate processing core that executed the program sends the program that was executed in the cycle of the pervious synchronization signal to the subsequent processing core.

Optionally, each of the intermediate processing cores is configured to send, according to the number of received synchronization signals, the program that was executed in the cycle of the previous synchronization signal to the subsequent processing core. For example, when the number of the synchronization signals received by the intermediate processing core exceeds a preset number, the intermediate processing core sends the program that was executed in the cycle of the previous synchronization signal to the subsequent processing core.

For processing cores in the logical core chain other than the tail processing core, after the synchronization signal comes, the program executed by the present core in the cycle of the previous synchronization signal is sent to the next processing core in the logical core chain (that is, the subsequent processing core in the preset execution sequence).

Optionally, the intermediate processing core is configured to, at the time of receiving the program sent by the previous processing core, send the program that was executed in the cycle of the previous synchronization signal to the subsequent processing core. The head processing core is configured to, at the time of obtaining the program according to the instruction, send the program that was executed in the cycle of the previous synchronization signal to the subsequent processing core.

In this embodiment, all processing cores except the tail processing core receive and send programs simultaneously, so that all processing cores can implement program update in parallel, greatly reducing the delay caused by program update.

Optionally, after sending the program executed in the cycle of the previous synchronization signal and receiving, in the cycle of the current synchronization signal, the new program that needs to be run, each processing core starts to execute the program just received.

Each processing core in the plurality of processing cores is further configured to, after executing the corresponding program received, send the synchronization request signal respectively.

In one embodiment, the head processing core is further configured to store a first update program. The first update program is a resident program in the head processing core, which is controlled by the Host or top-level MCU to be written and stored in the PRAM of the head processing core during initialization. During the entire task, the first update program itself is not changed. Only when the first update program needs to be changed due to the program change, it is changed by re-initializing the head processing core. The program obtained according to the instruction may be, for example, a computation program, which is stored in the external memory, and the executed program sent by the head processing core to the subsequent processing core refers to the executed computation program.

The head processing core is configured to send the instruction, including:

the head processing core is configured to execute the first update program when receiving the synchronization signal, and send the instruction according to the first update program.

The intermediate processing core is further configured to store a second update program. The second update program is a resident program in the intermediate processing core, which is controlled and imported by the Host or top-level MCU, and is written and stored in the PRAM of each intermediate processing core during initialization. During the entire task, the second update program itself is not changed. Only when the second update program needs to be changed due to program change, it is changed by re-initializing each intermediate processing core.

Each intermediate processing core executes the second update program when receiving the synchronization signal, and sends the program that was executed in the cycle of the previous synchronization signal to the subsequent processing core in the logical core chain according to the second update program.

Optionally, when each intermediate processing core receives the synchronization signal, it determines whether to execute the second update program according to the number of received synchronization signals, and sends the program that was executed in the cycle of the previous synchronization signal to the subsequent processing core in the logical core chain by executing the second update program.

Specifically, when the number of synchronization signals received by the intermediate processing core exceeds a preset number, the second update program is executed, where the preset number is the sequence number of the intermediate processing core in the preset execution sequence. For example, if the intermediate processing core is located at the fifth position in the preset execution sequence, that is, the fifth processing core in the logical core chain, when the fifth processing core receives more than 5 synchronization signals, the second update program is executed.

It should be noted that, in this data processing apparatus, the task allocation and scheduling strategy has been determined before the data processing apparatus starts to run, that is, it is determined at the time of compilation. The update program is resident in each processing core, and the computation program is stored in the external Memory. Thus, the program complexity during operation of the data processing apparatus is reduced.

In one embodiment, due to the limited capacity of the PRAM, when the PRAM of the processing core is not able to store the entire program, the program may be divided into program segments, and the program segments are sequentially updated and executed. That is, the program obtained according to the instruction is a program segment.

Optionally, the abovementioned data processing apparatus further includes at least one interconnection structure, and the interconnection structure refers to, for example, Network On Chip (NoC), bus, or switch. In this embodiment, the interconnection structure is NoC.

The interconnection structure is used to connect the MME and each processing core; and the head processing core transmits data with the MME through the interconnection structure. For example, the head processing core sends the instruction to the MME through the interconnection structure, and the MME sends the program obtained according to the instruction to the head processing core through the interconnection structure. Each of the other processing cores receives the program sent by the previous processing core in the preset execution sequence through the interconnect structure.

In the data processing apparatus provided by the embodiment of the present disclosure, the head processing core sends the instruction and receives the program obtained according to the instruction, and each of the other processing cores receives and executes the program sent by the previous processing core in the preset execution sequence, without each processing core reading data from the Memory separately, thereby reducing power consumption. In addition, each processing core executes the same complete program, which avoids data exchange between cores, reduces the delay and power consumption caused by exchanging data, and improves the efficiency of data processing.

Figure 4:
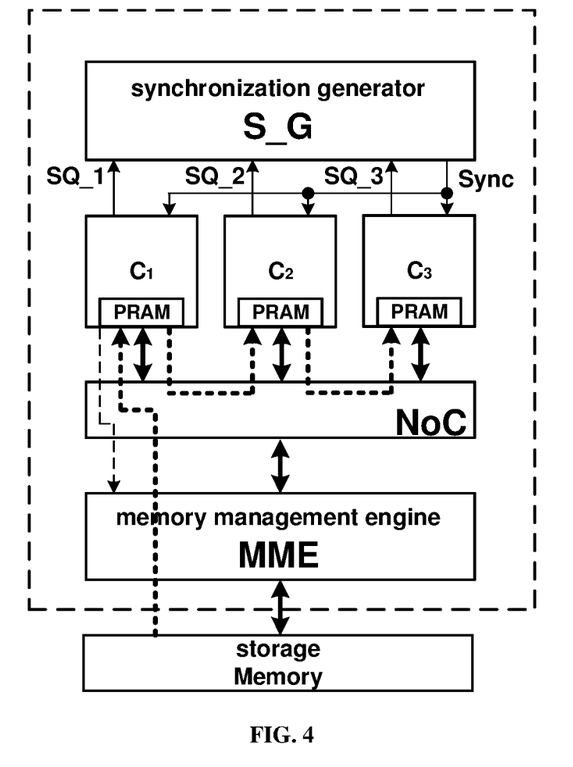
FIG. 4 is a schematic structural diagram of a data processing apparatus according to another embodiment of the present disclosure.

FIG. 4 is a schematic structural diagram of a data processing apparatus according to an embodiment of the present disclosure.

As shown in FIG. 4, the data processing apparatus includes S_G, MME, NoC and three processing cores. The preset execution sequence of the three processing cores is the head processing core $C_1$, the intermediate processing core $C_2$ and the tail processing core $C_3$. That is, the program is sent from $C_1$ to $C_2$, and then sent from $C_2$ to $C_3$.

Each processing core is provided with a PRAM, which is used to store programs, and the storage capacity of each PRAM is set to 36 KB.

The first part of the capacity of the PRAM of $C_1$ is used to store the resident first update program, and the second part is used to store the computation program.

Optionally, the first parts of the capacities of the PRAIVIs of $C_2$ and $C_3$ are used to store the resident second update program, and the second parts are used to store the computation programs. In this case, the second parts of the three processing cores have the same capacities.

Since the computation programs executed by $C_1$, $C_2$ and $C_3$ are the same, each processing core may be set to store only a maximum of 32 KB of computation program segments each time.

If the computation program of a neural network is 64 KB, and each core can only store up to 32 KB of the computation program at a time, the computation program of the neural network will be updated and executed in two program segments, which are the first program segment P_1 and second program segment P_2.

Figure 5:
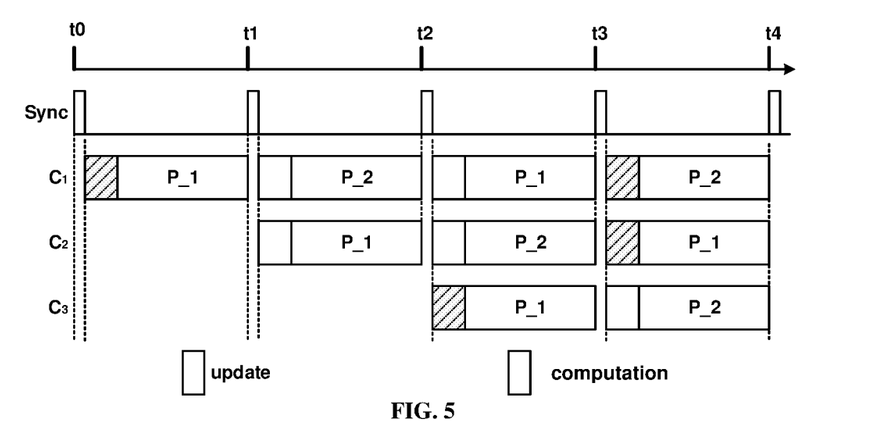
FIG. 5 is a timing diagram of processing cores executing programs in the data processing apparatus as shown in FIG. 4.

FIG. 5 is the sequence diagram of program execution in the data processing apparatus as shown in FIG. 4

As shown in FIG. 5, first, at time t0, the S_G generates the first synchronization signal Sync, and sends it to each of the three processing cores, respectively.

First, $C_1$ runs the resident first update program, and according to the first update program, $C_1$ sends an instruction to the MME. After the MIME receives the instruction, it parses and executes the instruction, and reads P_1 from the external Memory and sends it to $C_1$.

Since each processing core receives the first Sync, $C_1$ does not send the executed program segment to $C_2$, nor does $C_2$ send the program executed in the cycle of the previous Sync to $C_3$. Therefore, neither $C_2$ nor $C_3$ receives the program segment executed by the previous processing core in the cycle of the previous synchronization signal. Thus, after receiving P_1 sent by the MIME, $C_1$ starts to execute P_1. $C_2$ and $C_3$ do not have any update and computation during the t1 period, so when the Sync comes, they immediately send their respective synchronization request signals to the S_G. That is, $C_2$ sends a second synchronization request signal SQ_2 to the S_G, and $C_3$ sends a third synchronization request signal SQ_3 to the S_G.

In the period from t0 to t1, after receiving P_1, $C_1$ starts to execute P_1; and when the execution is completed, $C_1$ sends a first synchronization request signal SQ_1 to the S_G. At time t1, after the S_G has collected SQ_1, SQ_2 and SQ_3, it generates the second Sync.

After $C_1$ receives the second Sync, it runs the resident first update program, and sends an instruction to the MME according to the first update program; after the MME receives the instruction, it parses and executes the instruction, and sends the second program segment P_2 to $C_1$. At the same time, since what $C_1$ receives is not the first Sync, $C_1$ sends the program segment executed in the previous synchronization cycle to the next core, that is, $C_1$ sends P_1 to $C_2$, and $C_2$ saves the received program in the PRAM.

$C_2$ receives P_1 sent by $C_1$, and since $C_2$ has no executed program in the cycle of the previous synchronization signal, no executed program segment is sent to $C_3$. After $C_2$ receives P_1 sent by $C_1$, it starts to execute P_1.

$C_3$ does not have any update and computation in the second Sync cycle. After receiving the second Sync, it immediately sends SQ_3 to the S_G.

In the period from t1 to t2, after receiving P_2 and sending P_1, $C_1$ starts to execute P_2; and until the execution is completed, $C_1$ sends SQ_1 to the S_G. In the period from t1 to t2, after receiving P_1, $C_2$ starts to execute P_1; and until the execution is completed, $C_2$ sends SQ_2 to the S_G.

At time t2, after the S_G has collected SQ_1, SQ_2 and SQ_3, it generates the third Sync, and sends to the three processing cores respectively.

After $C_1$ receives the third Sync, it runs the resident first update program, and sends an instruction to the MME according to the first update program; after the MME receives the instruction, it parses and executes the instruction, namely, reading the first program segment of the new program from the external Memory, and sending it to $C_1$. In this embodiment, the first program segment of the new program is still P_1. The present disclosure takes this as an example but is not limited thereto.

Since $C_1$ continues to restart the execution of the neural network program, that is, re-executing P_1, and what $C_1$ receives is not the first Sync, $C_1$ sends the program segment executed in the previous synchronization cycle, that is, $C_1$ send P_2 to $C_2$.

$C_2$ receives P_2 sent by $C_1$. Since $C_2$ executed a program in the previous synchronization cycle, $C_2$ runs the resident second update program, and according to the second update program, sends P_1 which was executed in the cycle of the previous synchronization signal to $C_3$.

$C_3$ receives P_1 sent by $C_2$, and executes P_1.

In the period from t3 to $t_4$, after receiving P_1 and sending P_2, $C_1$ starts to execute P_1, and until the execution is completed, $C_1$ sends SQ_1 to the S_G.

In the period from t3 to $t_4$, after receiving P_2 and sending P $C_2$ starts to execute P_2, and until the execution is completed, $C_2$ sends SQ_2 to the S_G.

In the period from t3 to $t_4$, after receiving P $C_3$ starts to execute P_1, and until the execution is completed, $C_3$ sends SQ_3 to the S_G.

At time $t_4$, after the S_G has collected SQ_1, SQ_2 and SQ_3, it generates the next synchronization signal Sync.

Repeating the above, each processing core runs P_1 and P_2, processing a complete neural network task.

In each time period, the head processing core receives the program segment sent by the MME to implement the program segment update, and then executes the program segment. In the present time period, each of the processing cores except the head processing core receives the program segment that is sent by the previous core in the logical core chain and executed in the cycle of the previous synchronization signal, and executes the received program segment, so as to achieve sequential transfer of program segments.

Optionally, in the first update program resident in the head processing core, a synchronization counter is provided to record the number of received Syncs, so that the head processing core knows, through the synchronization counter, how to configure the MME in the current synchronization time period, so as to instruct the MME to fetch the corresponding program segment from the Memory. The present disclosure is suitable for performing batch neural network processing tasks.

In an embodiment, the present disclosure provides a chip, including one or more data processing apparatuses provided by the above embodiments.

In an embodiment, the present disclosure provides a circuit board, including one or more chips provided by the above embodiments.

In an embodiment, the present disclosure provides an electronic device, including one or more circuit boards provided by the above embodiments.

Figure 6:
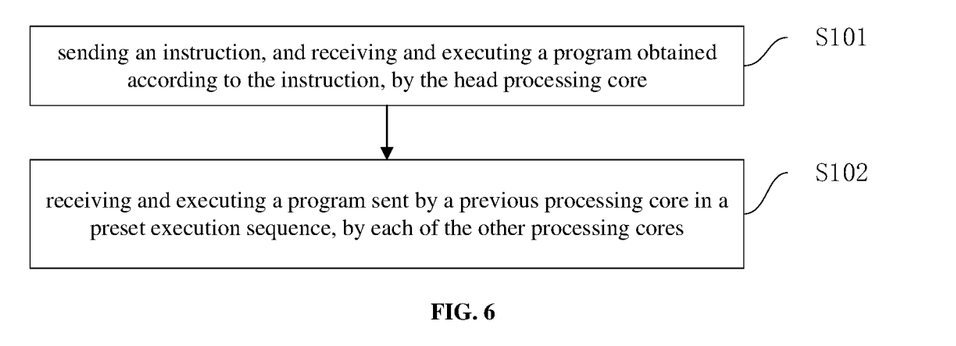
FIG. 6 is a schematic flowchart of a data processing method according to an embodiment of the present disclosure.

FIG. 6 is a schematic flowchart of a data processing method according to an embodiment.

As shown in FIG. 6, the data processing method, applicable in a data processing apparatus, the data processing apparatus including a plurality of processing cores with a preset execution sequence, the plurality of processing cores including a head processing core and at least one other processing core.

The data processing method includes:

Step S101, sending an instruction, and receiving and executing a program acquired according to the instruction, by the head processing core.

Step S102, receiving and executing a program sent by a previous processing core in a preset execution sequence, by each of the other processing cores.

In an embodiment, each of the other processing core receives and executes the program sent by the previous processing core in the preset execution sequence, including: each of the other processing cores receives and executes the executed program sent by the previous processing core.

Specifically, each of the other processing cores receives and executes the executed program sent by the previous processing core, including: each of the other processing cores receives and executes the latest executed program sent by the previous processing core. The latest executed program refers to the program that has been executed just before the current time, that is, the executed program that is closest to the current time.

In an embodiment, the other processing cores include at least one intermediate processing core and a tail processing core. In Step S102, each of the intermediate processing cores sends an executed program to a subsequent processing core.

Specifically, each of the intermediate processing cores sends the program that has been just executed to the subsequent processing core.

Optionally, the head processing core, at the time of receiving the program according to the instruction, sends the just-executed program to the subsequent processing core.

More specifically, each intermediate processing core sends the just-executed program to the subsequent processing core, and after receiving the program sent by the previous processing core, starts to execute the respective received program.

After sending the just-executed program to the subsequent processing core and receiving a new program obtained according to the instruction, the head processing core starts to execute the new program.

After receiving the just-executed program sent by the previous processing core, the tail processing core starts to execute the program.

In an embodiment, the head processing core sends an instruction, and receives and executes the program obtained according to the instruction, including: the head processing core sends the instruction to the MME, and receives and executes the program read by the MME from the external Memory according to the instruction.

In Step S101, after sending the instruction, and before receiving and executing the program obtained according to the instruction, by the head processing core, it further includes:

the MME receives the instruction sent by the head processing core, obtains the program from the external Memory according to the instruction, and sends the obtain program to the head processing core.

In an embodiment, the method further includes: each of the processing cores in the plurality of processing cores, after executing the corresponding program received, sends the synchronization request signal.

The synchronization generator generates a synchronization signal after receiving the synchronization request signals sent by all processing cores of the data processing apparatus, and sends the synchronization signal to each of the processing cores, respectively.

Among them, the head processing core sends the instruction, including: the head processing core sends the instruction according to the synchronization signal. Each of the other processing cores receives and executes the program sent by the previous processing core in the preset execution sequence, including: each of the other processing cores receives and executes the program sent by the previous processing core according to the synchronization signal.

Further, each of the intermediate processing cores is configured to send, according to the synchronization signal, the program that was executed in the cycle of the previous synchronization signal to the subsequent processing core.

Optionally, the head processing core is configured to send the instruction, and receive and execute the program obtained according to the instruction, including: the head processing core is configured to, at the time of obtaining the program according to the instruction, send the program that was executed in the cycle of the previous synchronization signal to the subsequent processing core.

Each intermediate processing core, according to the synchronization signal, sends the program executed in the cycle of the previous synchronization signal to the subsequent processing core, including: each intermediate processing core, at the time of receiving the program sent by the previous processing core, sends the program that was executed in the cycle of the previous synchronization signal to the subsequent processing core.

According to a sixth aspect of the present disclosure, there is provided a computer storage medium storing a computer program, which, upon execution by a processor, implements the data processing method of the fifth aspect.

According to a seventh aspect of the present disclosure, there is provided an electronic device, including a memory, a processor, and a computer program stored in the memory and executable by the processor, wherein the processor executing the program implements the data processing method of the fifth aspect.

According to an eighth aspect of the present disclosure, there is provided a computer program product, including computer instructions, wherein, when the computer instructions are executed by a computing device, the computing device performs the data processing method of the fifth aspect.

It should be understood that the above specific embodiments of the present disclosure are used only for exemplary illustration or explanation of the principle of the present disclosure, but not to limit the present disclosure. Therefore, any modifications, equivalent replacements, improvements, etc. made without departing from the spirit and scope of the present disclosure should be included within the protection scope of the present disclosure. Furthermore, the appended claims of this disclosure are intended to cover all variations and modifications that fall within the scope and boundaries of the appended claims, or the equivalents of such scope and boundaries.

Although the embodiments of the present disclosures have been described in detail, it should be understood that the various changes, substitutions, and alterations could be made hereto without departing from the spirit and scope of the disclosures.

Clearly, the above embodiments are only examples for clear description, and are not intended to limit the manner of implementation. For those of ordinary skill in the art, there are other variations or changes that can be made in different forms based on the above description. It is not necessary or possible to exhaust all embodiments here. The obvious variations or changes derived therefrom are still within the protection scope of the present disclosure.

Those skilled in the art would appreciate that embodiments of the present disclosure may be provided as a data processing method, a data processing system, or a computer program product. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage media (including, but not limited to, disk storage, CD-ROM, optical storage, etc.) having computer-usable program code embodied therein.

The invention claimed is:

1. A data processing apparatus, comprising:
a plurality of processing cores having a preset execution sequence, the plurality of processing cores including a head processing core and at least one other processing core; and
a synchronization generator, configured to generate a synchronization signal after receiving a synchronization request signal sent by each of the plurality of processing cores, and send the synchronization signal to each of the processing cores;
wherein in a cycle of a current synchronization signal:
the head processing core is configured to send an instruction according to the synchronization signal, and receive and execute a program obtained according to the instruction; and
each of the at least one other processing cores is configured to receive and execute a program sent by a respective previous processing core in the preset execution sequence, wherein the program sent by the respective previous processing core has been executed by the respective previous processing core in a cycle of a previous synchronization signal.

2. The data processing apparatus according to claim 1, wherein
each of the other processing cores include an intermediate processing core and a tail processing core; and
each of the intermediate processing cores is configured to send an executed program to a subsequent processing core.

3. The data processing apparatus according to claim 1, further comprising:
a memory management engine, configured to receive the instruction sent by the head processing core, obtain a program from an external storage according to the instruction, and send the obtained program from the external storage to the head processing core.

4. The data processing apparatus according to claim 1, wherein
each of the other processing cores is configured to receive and execute the program sent by the respective previous processing core according to the synchronization signal.

5. The data processing apparatus according to claim 1, wherein
each of the other processing cores include an intermediate processing core and a tail processing core; and
each of the intermediate processing cores is configured to send, according to the synchronization signal, a program that was executed in the cycle of a previous synchronization signal to a respective subsequent processing core.

6. The data processing apparatus according to claim 5, wherein
the intermediate processing core is configured to, at the time of receiving the program sent by the respective previous processing core, send the program that was executed in the cycle of the previous synchronization signal to the respective subsequent processing core.

7. The data processing apparatus according to claim 1, wherein the head processing core is further configured to store a first update program; and
the head processing core is configured to send the instruction, comprising:
the head processing core is configured to execute the first update program when receiving the synchronization signal, and send the instruction according to the first update program.

8. The data processing apparatus according to claim 5, wherein
each of the intermediate processing cores is further configured to store a second update program; and
the intermediate processing core is configured to execute the second update program according to the received synchronization signal, and send the program that was executed in the cycle of the previous synchronization signal to the respective subsequent processing core according to the second update program.

9. The data processing apparatus according to claim 8, wherein
the intermediate processing core is configured to execute the second update program according to number of received synchronization signals exceeding a preset number.

10. The data processing apparatus according to claim 4, wherein
each processing core in the plurality of processing cores is further configured to, after executing a program received respectively, send the synchronization request signal, respectively.

11. The data processing apparatus according to claim 1, wherein
the program obtained according to the instruction is a program segment.

12. A chip, comprising one or more data processing apparatuses according to claim 1.

13. A circuit board, comprising one or more chips according to claim 12.

14. A data processing method, applicable in a data processing apparatus, the data processing apparatus comprising:
a plurality of processing cores with a preset execution sequence, the plurality of processing cores comprising a head processing core and at least one other processing core; and
a synchronization generator, configured to generate a synchronization signal after receiving a synchronization request signal sent by each of the plurality of processing cores, and send the synchronization signal to each of the plurality of processing cores;
wherein the data processing method comprises, in a cycle of a current synchronization signal:
sending an instruction according to the synchronization signal, and receiving and executing a program obtained according to the instruction, by the head processing core; and
receiving and executing a program sent by a respective previous processing core in the preset execution sequence, by each of the at least one other processing core, wherein the program sent by the respective previous processing core has been executed by the respective previous processing core in a cycle of a previous synchronization signal.

15. The data processing method according to claim 14, wherein the head processing core, at the time of receiving the program obtained according to the instruction, sends-a program just-executed by itself in the cycle of the previous synchronization signal to a respective subsequent processing core; and each intermediate processing core sends-a program just-executed by itself in the cycle of the previous synchronization signal to the respective subsequent processing core, and after receiving the program sent by the respective previous processing core, starts to execute the program sent by the respective previous processing core.

16. The data processing method according to claim 14, wherein the data processing apparatus further comprises a memory management engine (MME), wherein the head processing core sends the instruction according to the synchronization signal, and receives and executes the program obtained according to the instruction comprising:

the head processing core sends the instruction to the MME, and receives and executes a program read by the MME from the external memory according to the instruction.

17. The data processing method according to claim 14, further comprising:

each of the processing cores in the plurality of processing cores, after executing a program received, sends the synchronization request signal.

18. An electronic device, including a memory, a processor, and a computer program stored in the memory and executable by the processor, wherein the processor executing the program implements the data processing method according to claim 14.

\* \* \* \* \*